(12) United States Patent
Veloso

(10) Patent No.: US 6,619,486 B1
(45) Date of Patent: Sep. 16, 2003

(54) FLIPPER/CATCHER INTEGRATED WITH GUIDE PIN FOR UP-STACKING OF DIE-CUT THERMOFORMED PARTS

(76) Inventor: Carlos J. Veloso, 1020 E. Elizabeth Ave., Linden, NJ (US) 07036

( * ) Notice: Subject to any disclaimer, the term of this patent is extended or adjusted under 35 U.S.C. 154(b) by 0 days.

(21) Appl. No.: 10/105,489

(22) Filed: Mar. 25, 2002

(51) Int. Cl.[7] ............................................. B65G 57/30
(52) U.S. Cl. .................... 211/49.1; 414/795.3; 414/923
(58) Field of Search .......................... 414/795.3, 416.1, 414/416.11, 416.09; 211/49.1, 85.5, 59.1, 89.01, 90.03, 106, 194

(56) References Cited

U.S. PATENT DOCUMENTS

| | | | |
|---|---|---|---|
| 284,916 A | * 9/1883 | Marks ......................... 126/12 |
| 336,801 A | * 2/1886 | Ossenfort ................... 131/366 |
| 393,767 A | * 12/1888 | Belokin et al. ............. 408/185 |
| 978,422 A | * 12/1910 | Zizinia ....................... 211/49.1 |
| 2,361,960 A | 11/1944 | Pelosi |
| 3,330,423 A | * 7/1967 | Kirkhof ..................... 414/788.2 |
| 3,499,063 A | * 3/1970 | Ninneman ................. 264/40.1 |
| 3,501,015 A | * 3/1970 | Behles ....................... 211/49.1 |
| 3,622,017 A | 11/1971 | Meuller et al. |
| 3,856,472 A | * 12/1974 | Schweitzer et al. .......... 417/48 |
| 4,580,696 A | * 4/1986 | Moore et al. ................ 221/61 |
| 4,671,722 A | * 6/1987 | Ray et al. ................. 414/788.4 |
| 4,712,691 A | * 12/1987 | Grill et al. .................. 211/49.1 |
| 5,064,236 A | * 11/1991 | Stanfield ..................... 294/161 |
| 5,391,049 A | 2/1995 | Reschlein |
| 5,415,519 A | * 5/1995 | Lee et al. ................. 414/795.3 |
| 6,241,457 B1 | 6/2001 | Huttig et al. |

OTHER PUBLICATIONS

Raco Enterprises Catalog page for item, "#29271 Stacker Hinges", (Date Not Available).*
Raco Catalog Page For Item 29271 Stacker Hinge. (Date Not Available).*

* cited by examiner

Primary Examiner—Janice L. Krizek
Assistant Examiner—Michael J. Kwon
(74) Attorney, Agent, or Firm—Richard L. Marsh

(57) ABSTRACT

A self-pivoted catcher for the up-stacking of die-cut thermoformed components comprises a low mass loop of material having opposed ends thereof journaled in a guide pin which is affixed in a narrow web of a catcher plate between apertures therein. The catcher is adapted to move upwardly with movement of the die-cut component as the individual component is separated from a previously die-cut larger sheet of components by the pusher as the pusher is advanced through the catcher plate. The loop is also adapted to engage the underside of a lip of the die-cut component thereby retaining the die-cut component on an upper side edge of the catcher.

19 Claims, 4 Drawing Sheets

FLIPPER/CATCHER INTEGRATED WITH GUIDE PIN FOR UP-STACKING OF DIE-CUT THERMOFORMED PARTS

BACKGROUND OF THE INVENTION

1. Field of the Invention

This invention relates to a self-pivoted flipper/catcher mounted on a guide pin for capturing thermoformed parts blanked from a sheet of thermoformed parts such as individual condiment containers, personal care items, blister packs and the like.

2. Prior Art Statement

In the art of thermoforming small containers, it is usual to vacuum form or blow mold a large sheet containing a plurality of the containers separated by webs. The large sheet is then advanced to a die cutting operation where individual dies are arranged in an array each die having a width and breadth corresponding to the outer dimensions of the lip of the container. The dies preferably have a series of interruptions around the periphery of the lip of each container to retain the containers on the large sheet for advancement into the separator/up-stacker. In the separator/up-stacker, pushers are arranged under an intermediate clamping plate and a catcher plate each plate having a plurality of apertures with close tolerance fit with its corresponding pusher wherein the large sheet is placed in registry with the pushers on the pusher plate, the pushers are then advanced toward the clamping plates thereby severing the individual containers from the sheet. In order to arrange the individual containers into stacks for transport to subsequent filling operations, the individual containers are captured above the catcher plate in a stacking column. Various means of retaining the containers in the stacking column are shown in the prior art references below. The prior art means of retaining generally results in a wide web between each row and column of the individual containers and alongside the perimeter edges of the large sheet thereby reducing the output of containers and creating additional scrap material. Still, problems exist with the upstacking operation. For instance, without guide pins, the stacked parts tend to tilt or stack in an arc. Tilting or arcing can be caused by defects in the webs of some parts, irregular die cut surfaces, lack of proper taper or shallow height. Shallow parts also tend to jump out of the stack when a new part is upstacked under the existing stack. Falling may also be caused by the operator by jostling adjacent stacks when picking up one stack of parts. These problems often result in the stacks falling over causing downtime to retrieve the fallen parts.

It is known to provide a magazine on a testing and stacking machine for carton or can tops wherein the magazine includes a plurality of vertical rods secured in a base. The can tops are tested for the presence of a metallic staple, and if present, are lifted into the magazine by a spring-loaded lifter. The edges of the can tops move a plurality of can top supporting fingers outwardly against a spring force when the can top is lifted toward the magazine. After the can top passes the end of the fingers, the fingers are forced under the can top by the spring force thereby capturing the can top in the magazine. The lifter is returned to its original position for receiving another can top. For instance, see the U.S. Pat. No. 2,361,960, issued on Nov. 7, 1944, to Nicholas Pelosi. The spring loaded fingers would damage light thermoformed parts resulting in considerable waste.

It is also known to provide an accumulator station for receiving filled and sealed ice cream cups wherein pairs of cups are forced upwardly through support gates which are yieldably swingable toward a vertical position. The support gates are biased to assume an obliquely converging relation capable of temporarily supporting the elevated row of cups in underneath engagement therewith. For instance, see the U.S. Pat. No. 3,622,017 issued on Nov. 23, 1971 to Meuller, et al. The support gates are massive and would damage the light thermoformed parts thus resulting in waste.

It is further known to provide a catcher for stacking components die-cut from a continuous web of material wherein the catcher comprises a mounting bracket in the form of a generally U-shaped yoke, a pivot pin and first and second catcher plates attached to the bracket by the pin. The U-shaped yoke carrying the catchers is screwed to the top surface of the stacker board between two adjacent windows with the first catcher plate extending partially over one window and the and second catcher plate extending over the adjacent window. Lifters elevate the die-cut components such that the flanges thereof engage the bottoms of the catcher plates. The plates hinge on the pin and swing upwardly to a generally vertical position beyond the edges of the plates whereafter the lifters are retracted and the catcher plates return by gravity to a generally horizontal position. For instance, see U.S. Pat. No. 5,391,049 issued on Feb. 21, 1995 to William Reschlein. The substantial width of the U-shaped yoke results in a wide web of material between adjacent components thus resulting in wasted material. Furthermore, the catcher plates are unnecessarily thick, wide and of considerable mass for the capture of the extremely light weight thermoformed parts, the considerable mass sometimes contributing to damaged or distorted thermoformed parts. Additionally, in the catcher of Reschlein, a four by four array of apertures would require a total of 40 catchers to provide for catching the upstacked parts thus requiring the precision drilling of 80 holes to mount the yokes carrying the catchers. Placement of the guide pins of this invention at the corners of the apertures would reduce the cost of preparing catcher plate and in larger catcher plates having a greater number of apertures, the improvements recited in the instant application are further multiplied.

Finally, it is known to capture successive individual thermoformed units into a single stack is a yieldable tubular sleeve having longitudinal slits running from a widened upper end to a lower end forming lamella that project into to the path of the articles to be stacked engaging under the rim or lip of the article. For instance, see the U.S. Pat. No. 6,241,457B1 issued on Jun. 5, 2001 to Hüttig, et al. The yieldable tubular sleeves require that the rim or lip of the article have considerable strength to move the lamella. Many thermoformed parts do not have the necessary lip strength and therefore are destroyed.

SUMMARY OF THE INVENTION

The prior art means of retaining a stack of individual containers removed from a large sheet of die-cut thermoformed material generally results in a wide web between each row and column of the individual containers thus reducing the output of containers and creating additional scrap material. Furthermore, the mass of the prior art means of retaining is greater than necessary therefore more costly. Therefore, it is an object of this invention to provide a self-pivoted catcher for the up-stacking of die-cut thermoformed component parts which comprises a low mass loop of material having opposed ends thereof journaled in a guide pin wherein the guide pin is affixed in a narrow web of a catcher plate between parallel rows of the die-cut parts removed from a larger sheet. The low mass loop is adapted to move upwardly with movement of die-cut component separated from a larger sheet and advanced through catcher plate, the low mass loop adapted to engage the underside of a lip of the die-cut component thereby retaining the die-cut component on an upper side edge of the low mass loop.

It is principal aim of this invention to provide a self-pivoted catcher journaled on a guide pin disposed in a narrow web of a catcher plate between parallel rows of die-cut parts removed from a larger sheet wherein the guide pin has a thickness dimension substantially equal to the width of the narrow web.

An intention of this invention is to provide a self-pivoted catcher journaled on a guide pin disposed in a narrow web of a catcher plate between parallel rows of die-cut parts removed from a larger sheet wherein the guide pin has a cross section chosen from various shapes, such asround, lobed, rectangular, trapezoidal, triangular, oval or elliptical.

A purpose of this invention is to provide a self-pivoted catcher journaled on a guide pin disposed in a narrow web of a catcher plate between parallel rows of die-cut parts removed from a larger sheet wherein the guide pin has a shoulder spaced from an end secured in the catcher plate and wherein the journal hole is disposed into the guide pin outwardly from the shoulder at least one-half the thickness of the catcher loop.

A goal of this invention is to provide a self-pivoted catcher journaled on a guide pin disposed in a narrow web of a catcher plate between parallel rows of die-cut parts removed from a larger sheet wherein the guide pin has a shoulder spaced from an end secured in the catcher plate and wherein the guide pin has a reduced end on one end thereof, the reduced end secured to the catcher plate by force fitting the reduced end into the plate, threadedly securing the reduced end onto the plate or by welding the reduced end to the plate.

A principle of this invention is to provide a self-pivoted catcher for the up-stacking of die-cut thermoformed component parts which comprises a low mass loop of material having opposed ends thereofjournaled in a guide pin wherein the guide pin is affixed in a narrow web of a catcher plate between parallel rows of the die-cut parts removed from a larger sheet, the low mass loop formed into a shape chosen from substantially circular, polygonal, triangular, oval or elliptical.

Another principle of this invention is to provide a self-pivoted catcher for the up-stacking of die-cut thermoformed component parts which comprises a low mass loop of material having opposed ends thereofjournaled in a guide pin wherein the guide pin is affixed in a narrow web of a catcher plate between parallel rows of the die-cut parts removed from a larger sheet, the low mass loop formed from a length of round stock selected from the group comprising metallic wire, molded thermoplastic or combinations thereof.

Another goal of this invention is to provide a self-pivoted catcher journaled on a guide pin disposed in a web of a catcher plate wherein the depth of the low mass loop extending into an aperture in the catcher plate is at least equal to thickness of the lip of the die-cut thermoformed component part.

Yet another feature of this invention is to reduce the number of locations of catchers and the number of holes drilled through the catcher plate by locating guide pins having catchers journaled therein at the corners of the apertures in the catcher plate.

Another purpose of this invention is to provide a self-pivoted catcher journaled on a guide pin disposed in a web of a catcher plate wherein the guide pin has a low mass loop extending into each one of the apertures in the catcher plate adjacent the guide pin.

Another intention of this invention is to provide a self-pivoted catcher journaled on a guide pin disposed in a web of a catcher plate wherein the guide pin is centrally located between adjacent apertures and centrally located on an edge web contiguous with an edge aperture.

Another aim of this invention is to provide a self-pivoted catcher journaled on a guide pin disposed in a web of a catcher plate wherein a portion of the low mass loop is resting on the web of the catcher plate adjacent the guide pin.

Still another aim of this invention is to provide a self-pivoted catcher for the up-stacking of die-cut thermoformed component parts which comprises a low mass loop of material having opposed ends thereofjournaled in a guide pin wherein the guide pin is affixed adjacent an edge of an aperture of a catcher plate.

An aspect of this invention is to provide a self-pivoted catcher for the up-stacking of die-cut thermoformed component parts, the catcher comprising a loop of material having opposed ends thereofjournaled in a guide pin affixed in a web of a catcher plate between parallel columns of the die-cut parts removed from a larger sheet, the catcher adapted to move upwardly with movement of the component separated from a large sheet and advanced through the catcher plate, the loop adapted to engage the underside of a lip of the die-cut component thereby retaining the die-cut component on an upper side edge of the catcher.

Another aspect of this invention is to provide a plurality of guide pins for guiding a plurality of die-cut component parts in the up-stacking of the die-cut parts, the guide pins arranged on and affixed to each web between parallel rows and parallel columns of apertures formed through a catcher plate, the catcher plate adapted to have a plurality of pushers forced through the apertures for separating the individual component parts from a larger sheet of die-cut thermoformed parts, each of the plurality of guide pins carrying at least one catcher comprising a loop of material having opposed ends thereofjournaled in the guide pin, each catcher adapted to move upwardly with movement of the pusher carrying the individual die-cut component cut from the larger sheet upwardly through the catcher plate, the loop engaging the underside of a lip of the die-cut component, the loop retracting to a substantially horizontal position upon retraction of the pusher from the aperture of the catcher plate, thereby retaining the die-cut component on an upper side edge of the catcher.

Still another goal of this invention is to provide a self-pivoted catcher journaled on a guide pin disposed in a web of a catcher plate wherein the catcher is adapted to engage at least an edge of a lip of the individual thermoformed part thereby retaining the die-cut component on an upper side edge of the catcher plate.

Still another aspect of this invention is to provide a self-pivoted catcher journaled on a guide pin disposed in a web of a catcher plate wherein the catcher falls by gravity under the underside of the lip of the die-cut component of the individual thermoformed part as the means for retracting retracts the catcher plate.

Yet another object of this invention is to provide a self-pivoted catcher journaled on a guide pin disposed in a web of a catcher plate wherein the dies, the holes and the apertures are arranged in parallel rows and columns, diagonal rows and parallel columns, diagonal rows and diagonal columns or offset rows and columns and wherein the apertures are selected from shapes having parallel edges, angled edges, curved edges or combinations thereof

DESCRIPTION OF THE PREFERRED EMBODIMENTS

While the various features of this invention are hereinafter described and illustrated as a self-pivoting catcher for the up-stacking of die-cut thermoformed component parts, it is to be understood that the various features of this invention can be used singly or in various combinations thereof as a guide and catcher combination for the up-stacking of die-cut thermoformed component parts as can hereinafter be appreciated from a reading of the following description.

Figure 1:
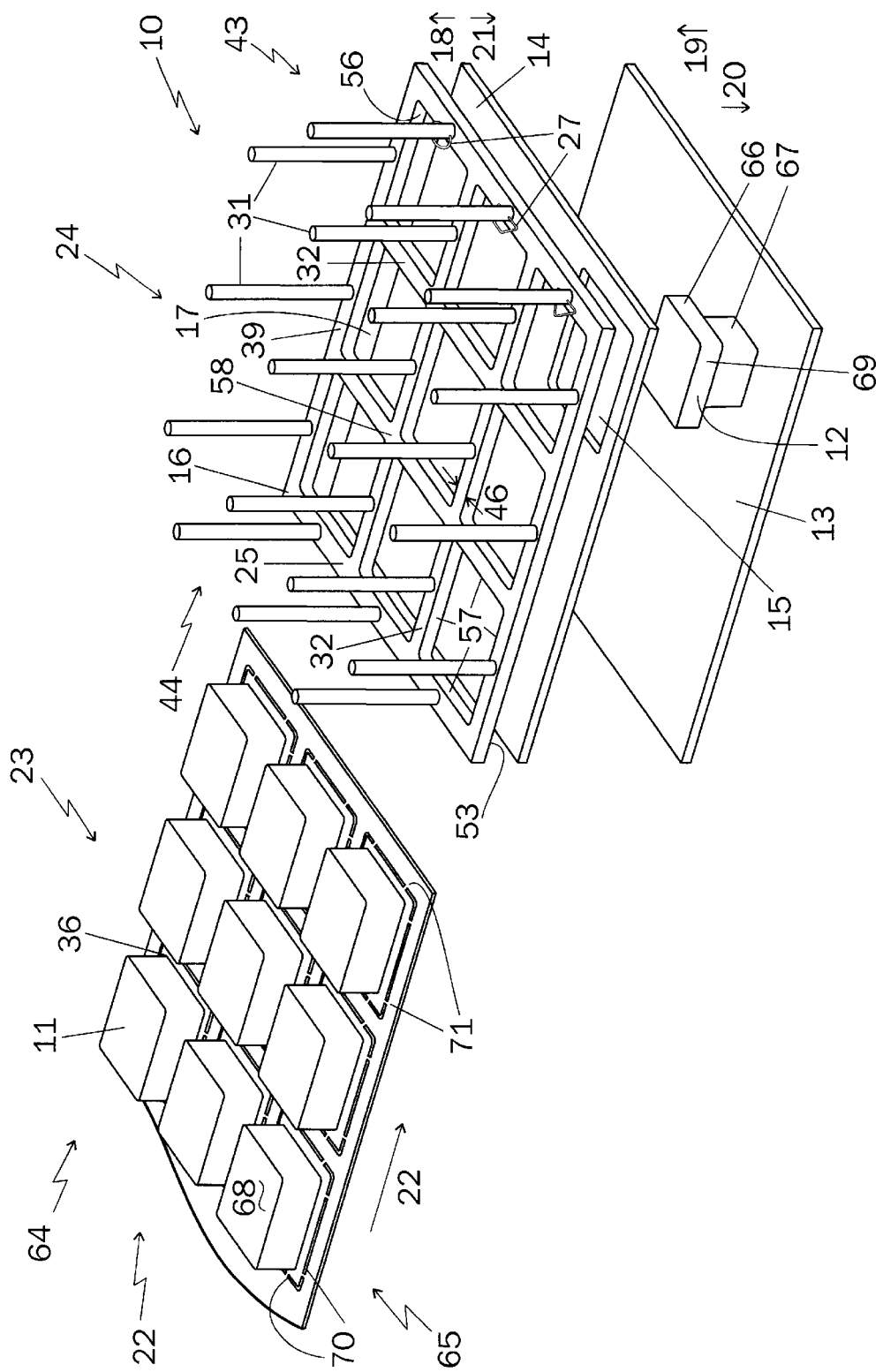
FIG. 1 is a perspective view of a separator/stacker having a pusher plate with one of a plurality of pushers shown mounted thereon, an intermediate plate shown separated from the pusher plate, the intermediate plate having a plurality of apertures therethrough and a catcher plate shown separated from the intermediate plate and carrying a plurality of guide pins and self-pivoting catchers of this invention. A large sheet of die-cut containers adapted to be separated from the large sheet by the separator/stacker is shown separated from the separator/stacker in alignment with the space between the intermediate plate and the catcher plate.
Figure 2:
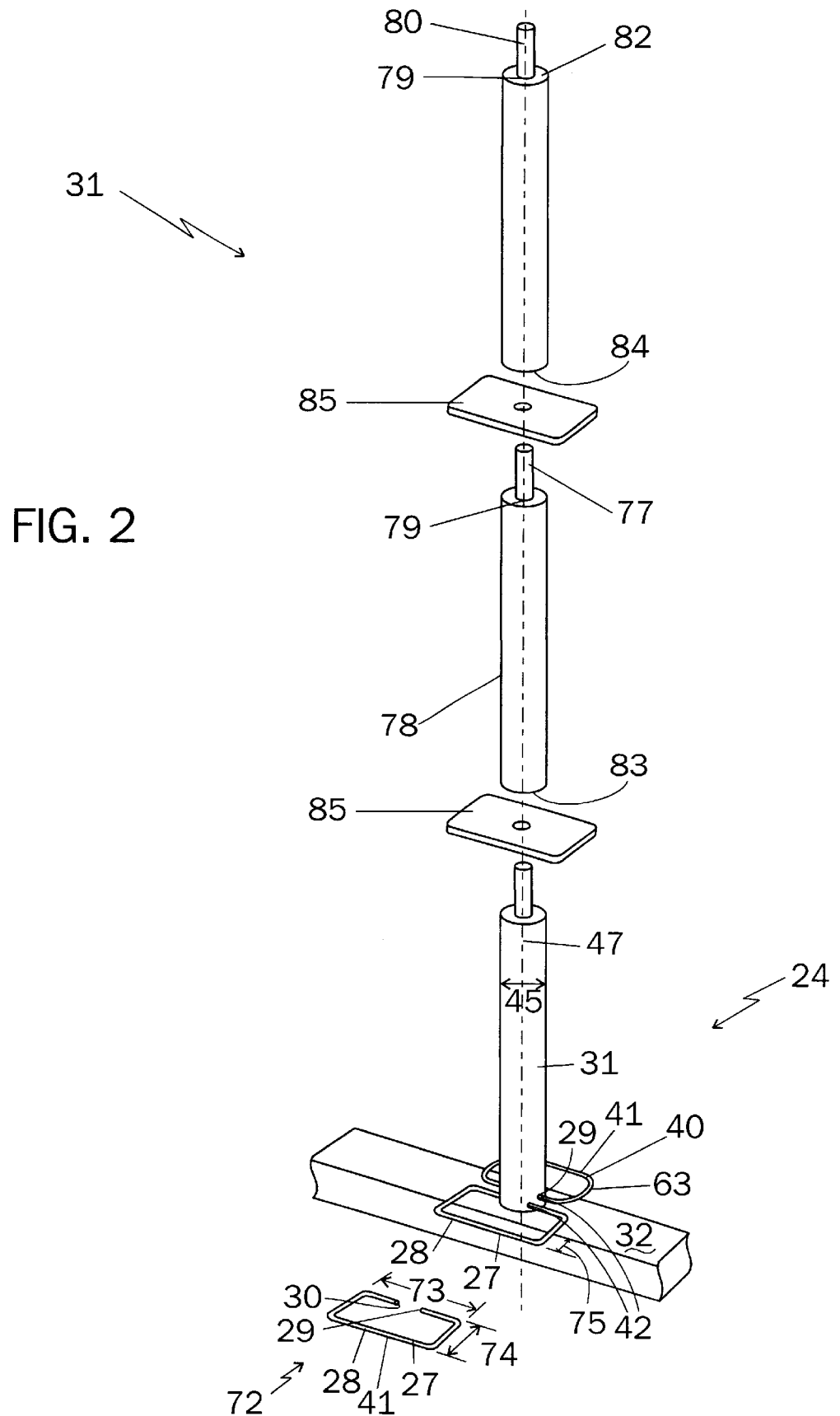
FIG. 2 is a greatly enlarged perspective view of the preferred embodiment of the guide pin showing the arrangement of the self-pivoting catchers journaled in the guide pin.
Figure 3:
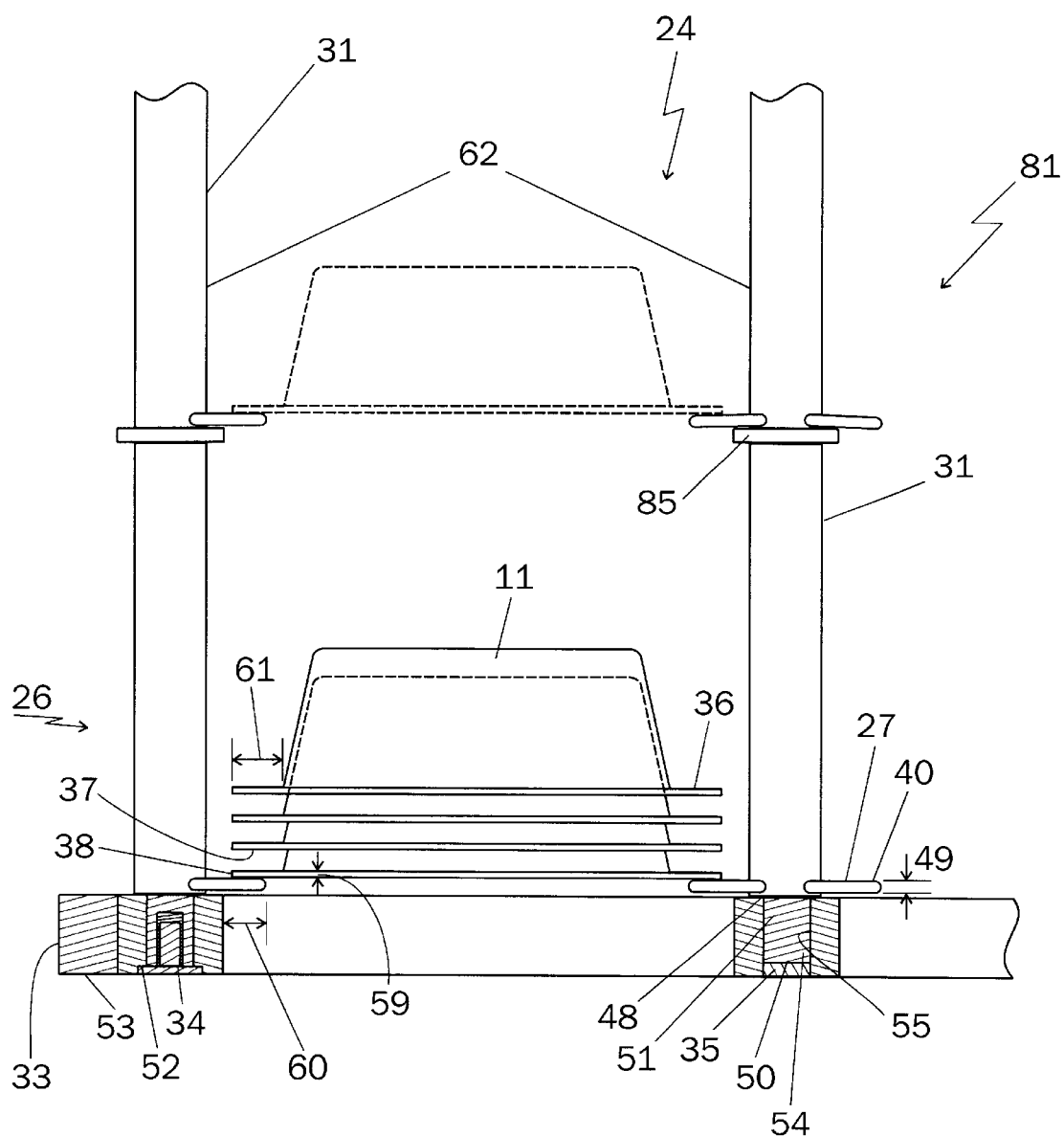
FIG. 3 is an enlarged view of one aperture, a partial stack of die-cut parts held between opposing guide pins and supported on the self-pivoting catchers of this invention, the plate and guide pins therein partially in section.

Referring now to FIGS. 1–3, a separator/stacker device 10 for the separation and up-stacking of individual die-cut thermoformed components or parts 11 comprises a plurality of pushers such as pusher 12 mounted on a pusher plate 13, an intermediate clamping plate 14 having a plurality of holes, Such as hole 15 therethrough and a catcher plate 16 having a plurality of apertures 17 therethrough. A means for advancing, not shown, is adapted to advance intermediate clamping plate 14 toward catcher plate 16 or catcher plate 16 toward intermediate clamping plate 14, generally represented by arrow 18, thus establishing a clamping relationship between intermediate clamping plate 14 and catcher plate 16. Associated with the means for advancing is a means for driving pusher plate 13 toward intermediate clamping plate 14 and catcher plate 16 generally in the direction of arrow 19. Means for driving, though not shown, is adapted to drive pushers 12 through holes 15 and apertures 17 thereby separating individual die-cut components 11 from a previously cut larger die-cut sheet 23 of individual die-cut component parts 11. Also associated with means for advancing is a means for retracting pusher plate 13 generally in the direction of arrow 20, a means for moving intermediate clamping plate 14 and catcher plate 16 into an open relationship, generally as shown by arrow 21 and a means for placing a previously cut sheet 23 of a plurality of individual die-cut component parts 11 generally in the direction of arrow 22 between catcher plate 16 and intermediate clamping plate 14. A means 24 for receiving individual die-cut components 11 is associated with catcher plate 16, means 24 for receiving comprising at least one upright guide pin 31 and at least one catcher/flipper mechanism 27. Pushers 12 on pusher plate 13 are aligned with holes 15, holes 15 are aligned with apertures 17, holes 15 and apertures 17 adapted to receive pushers 12 therethrough wherein pushers 12 are adapted to separate individual die-cut components 11 from larger, previously cut sheet 23 of individual die-cut component parts 11. Pushers 12 also raise individual die-cut components 11 at least above an upper surface 25 of catcher plate 16 after individual die-cut components 11 have been separated from previously cut sheet 23, means 24 for receiving individual die-cut component parts 11 adapted to retain individual die-cut components 11 in vertical stacks 26 as partially shown in FIG. 3 above catcher plate 16. In full operation, means for placing previously cut sheet 23 places previously cut sheet 23 into registry with apertures 17 whereafter means for advancing advances one of intermediate clamping plate 14 and catcher plate 16 into clamping relationship with the other of catcher plate 16 and intermediate clamping plate 14 thereby clamping previously cut larger sheet 23 therebetween. Means for driving then drives pushers 12 on pusher plate 13 upwardly through holes 15 in intermediate clamping plate 14, through previously cut sheet 23 of individual die-cut component parts 11 and through apertures 17 in catcher plate 16 thereby separating individual die-cut components 11 from previously cut sheet 23. In the instant invention, means 24 for receiving comprises at least one self-pivoted catcher 27 formed from a low mass loop 28 of material having opposed ends 29, 30 thereof journaled in a guide pin 31, guide pin 31 affixed in a narrow web 32 of catcher plate 16 at least between each aperture 17 of a plurality of apertures 17 in catcher plate 16. Each catcher 27 is adapted to move upwardly with the raising of a respective individual die-cut component 11 after that respective individual die-cut component 11 has been separated from previously cut larger sheet 23. It has been found that by using the guide pins 31 and self-pivoting catchers 27 of this invention that at least one more row 43 and at least one more column 44 of apertures 17 in catcher plate 16 may be disposed therethrough as compared to the prior art catchers because web 32 is reduced in width by up to one-quarter inch and thus in a ten by ten array of apertures 17, two and one-half inches of extra length and width are available in catcher plate 16 for the arrangement of additional apertures 17. Thus, a savings in operating costs due to increased output is achieved with the much narrower web 32 between apertures 17. It has also been found by the teachings herein that the use of the low mass loop 28 for catcher 27 results in less wear thereby establishing much longer operating sequences for a separating/upstacking device. Thus the use of low mass loop 28 having opposed ends 29, 30 journaled in journal holes 42 is an improvement over the devices of the prior art. Obviously, intermediate clamping plate 14 and pusher plate 13 must also be similarly arranged in order to align pushers 12, holes 15 and apertures 17 of their respective plates 13, 14, 16. Thus, a mold having the greater number of component parts formed therein from the same size of thermoplastic sheet results in a greater yield and the corresponding die cutting machine also has the greater yield and hence greater efficiency.

Self-pivoted catcher 27 for the up-stacking of individual die-cut component parts 11 comprising low mass loop 28 of material having opposed ends 29, 30 thereof journaled in guide pin 31 wherein guide pin 31 is affixed in narrow web 32 of catcher plate 16 is generally suited for use with previously cut larger sheet 23 having parallel rows 65 and parallel columns 64 of individual die-cut component parts 11 and thus self-pivoted catcher 27 is journaled on guide pin 31 substantially centrally located between adjacent apertures 17 on webs 32 between apertures 17 and centrally located on an edge web 39 adjacent an edge 33 of catcher plate 16 surrounding apertures 17. Low mass loop 28 is adapted to move upwardly with movement of individual die-cut component parts 11 separated from previously cut larger sheet 23 and advanced through catcher plate 16, low mass loop 28 adapted to engage the underside 37 of lip 36 of individual die-cut component parts 11 thereby retaining individual die-cut component parts 11 on an upper side edge 40 of low mass loop 28. Preferably, low mass loop 28 moves upwardly with pusher 12 carrying individual die-cut component parts 11 thereon, an outer portion 41 of low mass loop 28 engages at least an edge 38 of lip 36 of individual die-cut component 11 thereby retaining individual die-cut component parts 11 on upper side edge 40 of catcher 27, whereafter catcher 27 falls by gravity under underside 37 of lip 36 of individual die-cut component 11 as means for retracting retracts pusher plate 13 thus also retracting pushers 12 from individual die-cut components 11 separated from previously cut larger sheet 23.

Figure 4:
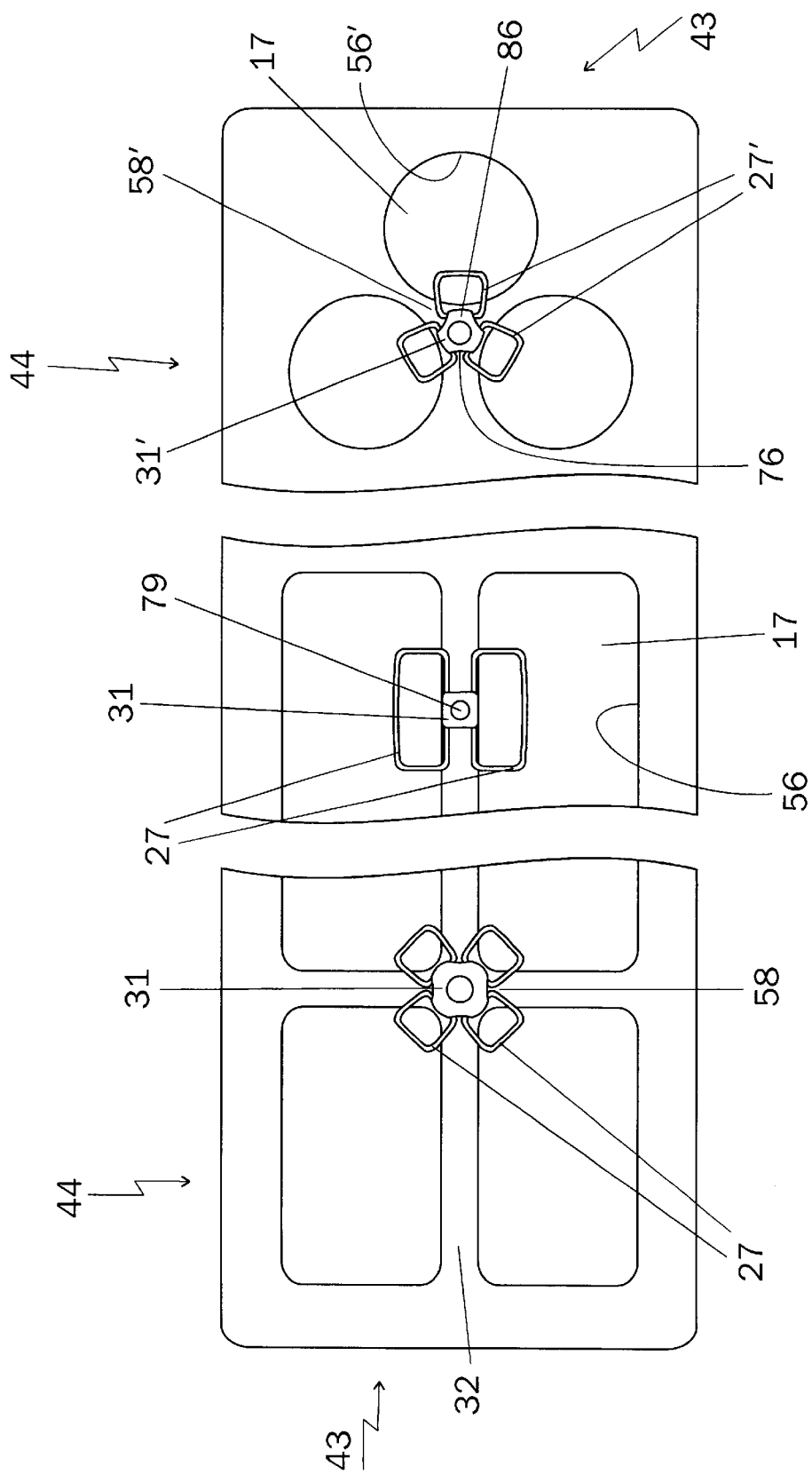
FIG. 4 is a plan view of an alternate arrangement of a catcher plate having guide pins of this invention disposed in intersections of webs between apertures in the catcher plate.

Referring especially now to FIG. 2, self-pivoted catcher 27 is journaled on guide pin 31 in a journal hole 42 drilled through guide pin 31 where guide pin 31 is disposed in narrow web 32 of catcher plate 16 between parallel rows 43 of apertures 17 wherein guide pin 31 has a thickness dimension 45 substantially equal to the width 46 of narrow web 32. Thus, guide pin 31 is preferably affixed adjacent an edge 57 of aperture 17 in catcher plate 16 and as apertures 17 are arranged in parallel rows 43, guide pin 31 is best described as being affixed adjacent edges 57 of adjacent apertures 17. Guide pin 31 may have a cross section chosen from various shapes, such as round, lobed, rectangular, oval or elliptical, some of these shapes shown in FIG. 4, but preferably guide pin 31 is substantially round as shown in FIG. 1. Where guide pin 31 is round and disposed in narrow web 32 between apertures 17, journal hole 42 is drilled through guide pin 31 on a chord spaced from a centerline 47 thus guide pin 31 has one catcher 27 comprising low mass loop 28 extending into each one of apertures 17 in catcher plate 16 adjacent the respective guide pin 31. Likewise, guide pin 31 is also disposed in web 32 between parallel columns 44 of apertures 17 thus providing for a balanced support of vertical stacks 26 of individual die-cut component parts 11. For ease of manufacture, guide pins 31 used in edge webs 39 may be made identical to guide pins 31 used in webs 32, however, it is within the scope of this invention to provide journal hole 42 on centerline 47 of guide pin 31 for use in edge web 39. Guide pin 31 having catcher 27 journaled therein is an improvement over the prior art devices as guide pin 31 provides the dual function of carrying at least one catcher 27 for catching individual die-cut component parts 11 and maintaining stacks 26 of individual die-cut component parts 11 in a substantially vertical orientation for ease of removal and subsequent packaging. When a lobed guide pin 31' is prepared as shown in FIG. 4, journal holes 42 are generally disposed into the lobes 86 in cusps 76 between lobes 86. Cusps 76 allow for easier machining of journal holes 42.

Self-pivoted catcher 27 journaled on guide pin 31 and disposed in narrow web 32 of catcher plate 16 preferably has journal hole 42 disposed into guide pin 31 outwardly from a shoulder 48 at least one-half the thickness 49 of catcher 27 wherein guide pin 31 has shoulder 48 spaced from an end 50, end 50 secured in catcher plate 16. As journal hole 42 is disposed into guide pin 31 upwardly from shoulder 48 at least one-half thickness 49 of catcher 27, catcher 27 does not bind against catcher plate 16 and readily assumes a slightly downward disposition relative to catcher plate 16. Guide pin 31 preferably has a reduced portion 51 on end 50 thereof, reduced portion 51 disposed into a hole 54 in catcher plate 16 and secured to catcher plate 16 by force fitting reduced portion 51 into hole 54 in catcher plate 16. Alternately guide pin 31 may be threadedly secured to catcher plate 16 with a threaded fastener 34 threaded into end 50 bearing against an enlarged spot face 52 disposed into bottom surface 53 of catcher plate 16. In yet another embodiment, reduced portion 51 may be secured onto catcher plate 16 by a weldment 35 in hole 54 wherein weldment 35 is machined smooth with bottom surface 53. In another embodiment, reduced portion 51 may be slightly tapered and disposed into hole 54 having tapered sidewalls 55. Other ways of securing guide pin 31 may be employed, such as swaging, cold heading or staking without departing from the intent of this invention. Guide pin 31 is preferably formed into a straight upright column from an elongated durable material selected from the group comprising metals, thermoplastics, fiber or combinations thereof wherein guide pin 31 is adapted to maintain vertical stacks 26 of individual die-cut components 11 in an upright manner. A sufficient number of guide pins 31 are preferably disposed around the periphery 56 of each aperture 17 that vertical stacks 26 do not fall from vertical disposition. Thus, self-pivoted catcher 27 journaled on guide pin 31 has a low mass loop 28 extending into each one of apertures 17 in catcher plate 16 adjacent guide pin 31. Wherein substantially rectangular apertures 17 as shown in FIG. 1 are disposed into catcher plate 16, four guide pins 31 surround each aperture 17, guide pins 31 preferably centrally located between adjacent apertures 17. In like manner, guide pins 31 are also disposed in edge web 39 of catcher plate 16 wherein guide pin 31 is also preferably centrally located on edge web 39. It is fully understood here that although guide pins 31 are preferably centrally located on each edge 57 of periphery 56, it is within the scope of this invention to place guide pins 31 at other locations on the periphery 56 of apertures 17 or at the intersections 58 of webs 32. For instance, referring to FIG. 4, in an array of circular apertures 17', guide pins 31' are disposed at intersections 58' of multiple apertures 17' as well as around periphery 56' thereof, guide pins 31' having a plurality of catchers 27' journaled therein. Therefore, the plurality of guide pins 31 having catchers 27 journaled therein provide the dual function of carrying at least one catcher 27 for catching individual die-cut component parts 11 and maintaining stacks 26 of individual die-cut component parts 11 in a substantially vertical orientation for ease of removal and subsequent packaging. It should be readily apparent here that with guide pins 31, 31' arranged adjacent apertures 17, 17' respectively, problems with upstacking are largely eliminated. For instance, individual die-cut components 11 stack readily as guide pins 31, 31' maintain close contact with lips 36 of individual die-cut components 11 thereby substantially preventing arcing even with individual die-cut components 11 having defects in lips 36. Furthermore, shallow individual die-cut components 11 also readily stack as the close contact with guide pins 31, 31' substantially prevents these shallow individual die-cut components 11 from jumping sideways when additional individual die-cut components 11 are upstacked. Additionally, when using a counter (not shown) to cause pushers 12 to advance an additional amount after a preset number of individual die-cut components 11 have been stacked, the preset number of individual die-cut components 11 are raised to an elevated position 81 spaced above upper surface 25 of catcher plate 16 for ease of removal without touching individual die-cut components 11 already stacked on upper surface 25.

In the prior art catcher of Reschlein, U.S. Pat. No. 5,391,049, a four by four array of apertures would require a total of 40 catchers to provide for catching the upstacked parts thus requiring the precision drilling of 80 holes to mount the yokes carrying the catchers. Although 40 guide pins 31 according to the teachings of this invention would also be required in the same four by four array of apertures 17, only 40 precision drilled holes would be required and the reduced width 46 of web 32 allows for more closely spacing of individual die-cut thermoformed component parts 11, hence greater efficiency in molding. In an alternate embodiment of this invention, placement of guide pins 31 at the corners of apertures 17 would further reduce the cost of preparing catcher plate 16 as only 25 guide pins 31, and hence holes 54, would be required to catch the upstacked individual die-cut components 11 thus reducing the cost of preparing catcher plate 16. In larger catcher plates 16 having a greater number of apertures 17, the improvements recited in the instant application are further multiplied.

Self-pivoted catcher 27 for up-stacking of individual die-cut component parts 11 preferably comprises a low mass loop 28 of material having opposed ends 29, 30 thereof journaled in guide pin 31, low mass loop 28 formed into a shape chosen from substantially circular, polygonal, triangular, oval or elliptical that best captures individual die-cut components 11 thereon. Referring to FIG. 2, one catcher 27 comprises a low mass loop 28 formed into a substantially rectangular shape having opposed ends 29, 30 fitted into journal holes 42 on either side of guide pin 31 while another catcher 27 is formed into an oval or elliptical shape having its opposed ends 29, 30 fitted into other journal holes 42. Other shapes of catchers 27 are shown on edge guide pins 31 in FIG. 1. The shape of catcher 27 depends upon the shape of individual die-cut component 11 being separated from previously cut larger sheet 23. For instance, it may be beneficial to use catcher 27 having a rounded edge for outer portion 41 where round individual die-cut components 11 are being separated and up-stacked. For individual die-cut components having a concave edge, it may be beneficial to use catcher 27 having a triangular shape. The choice of shape for catcher 27 may be determined empirically by removing one shape of catcher 27 from at least one guide pin 31 replacing same with another shape of catcher 27, however, it is a simple matter to remove guide pin 31 from catcher plate 16 where guide pin 31 has been removably affixed to catcher plate 16 with threaded fastener 34 or where guide pin 31 has been press fitted into hole 54. Thus, by removing guide pin 31 and replacing same with another guide pin 31 having a different shape for catcher 27 thereon, guide pin 31 has journal holes 42 disposed therein corresponding to the shape of catcher 27 hingedly mounted in journal holes 42. Though it may be necessary to provide for a different angle of entry for journal holes 42 for round, elliptical or oval shaped catchers 27, it has been found by the teachings of this invention that catchers 27 of the various shapes are interchangeable on guide pins 31 as journal holes 42 are formed of sufficient size to allow for ease of rotation of opposed ends 29, 30 of catchers 27 therein.

Preferably, catcher 27 is formed from a length of round stock selected from the group comprising metallic wire, molded thermoplastic, fiber or combinations thereof and bent into the desired shape. Catcher 27, separated from guide pin 31 in FIG. 2, shows a generally rectangular loop 28 having opposed ends 29, 30 spaced apart wherein opposed ends 29, 30 are adapted to be spread apart slightly when installing catcher 27 on guide pin 31 whereafter loop 28 resumes its generally rectangular shape with opposed ends 29, 30 rotatably mounted in journal holes 42. Though low mass loop 28 is preferably of round stock, it is within the scope of this invention to use a rectangular stock such as flat wire used for box staples or another shape as long as catcher 27 is rotatably mounted in journal holes 42. Preferably also, the depth of low mass loop 28 forming catcher 27 extends into aperture 17 in catcher plate 16 a distance 60 which is at least equal to thickness 59 of lip 36 of individual die-cut component parts 11 and preferably distance 60 is substantially equal to the width 61 of lip 36 thus lending considerable support to lip 36. Still, the portion 75 of depth 74 of catcher 27 extending into aperture 17 is greatly reduced from the prior art devices and therefore a shorter stroke and a faster cycle time for separating and upstacking of individual die-cut components are realized. Thus, another efficiency in the operation of a separating/upstacking device compounds the savings realized in the greater number of individual die-cut thermoformed component parts 11 available to be cut from previously cut larger sheet 23. Though as hereinbefore recited thickness 45 of guide pin 31 is substantially the same as the width 46 of web 32, web 32 may be slightly greater in width 46 thereby providing a clearance between guiding surface 62 of guide pin 31 and edge 57 of aperture 17. Also, as catcher 27 has opposed ends 29, 30 disposed in journal holes 42 wherein journal holes 42 are spaced inwardly from guiding surface 62 of guide pin 31, a portion 63 of low mass loop 28 may be resting on web 32 of catcher plate 16 adjacent guide pin 31 thus providing some support for catcher 27 as it supports vertical stack 26 of individual die-cut component parts 11.

As can be readily observed in FIG. 1, a plurality of guide pins 31 are provided for guiding a vertical stack 26 of a plurality of individual die-cut component parts 11 in the up-stacking of individual die-cut component parts 11, guide pins 31 arranged on and affixed to each web 32 between parallel rows 43 and parallel columns 44 of apertures 17 formed through catcher plate 16. Catcher plate 16 is adapted to have a plurality of pushers 12 forced through apertures 17 for separating individual die-cut component parts 11 from a larger, previously cut sheet 23 of individual die-cut component parts 11, each of plurality of guide pins 31 carrying at least one catcher 27 thereon. Catcher 27 comprises a loop 28 of material having opposed ends 29, 30 thereof journaled in guide pin 31, each catcher 27 adapted to move upwardly with movement of pusher 12 carrying individual die-cut component parts 11 separated from previously cut larger sheet 23 upwardly through catcher plate 16. Loop 28 engages underside 37 of lip 36 of individual die-cut component parts 11 wherein loop 28 retracts to a substantially horizontal position upon retraction of pusher 12 from aperture 17 of catcher plate 16, thereby retaining individual die-cut component parts 11 on an upper side edge 40 of catcher 27. Though parallel rows 43 and parallel columns 44 are shown in FIG. 1 as orthogonally arranged and comprise rectangular pushers 12, holes 15 and apertures 17, pushers 12, holes 15 and apertures 17 may be arranged in diagonal rows 43 and diagonal columns 44, diagonal rows 43' and parallel columns 44' as in FIG. 4 or offset rows 43 and columns 44. Additionally, apertures 17 may be selected from shapes having parallel edges, angled edges, curved edges or combinations thereof In a method of manufacturing separator/stacker device 10 of this invention, pusher plate 13 is formed from a flat plate of material, preferably steel, having a thickness sufficient to resist bending under the force of a means for driving pusher plate 13 in direction 19. Pusher plate 13 has a plurality of pushers 12 arranged in an array thereon, the array generally aligned with and corresponding in number to holes 15 in intermediate clamping plate 14 and apertures 17 in catcher plate 16 which in turn correspond to the number of individual die-cut components 11 to be separated from larger, previously formed and die-cut sheet 23. Pushers 12 are generally of a mushroom shape having an enlarged head 66 sitting atop a stem 67. Stem 67 is firmly affixed to pusher plate 13 by bolting pusher 12 to pusher plate 13. Enlarged head 66 is shaped in a complementary shape to the inside dimension of a base 68 of individual die-cut component 11 yet having relief along the side edges 69 thereof to prevent individual die-cut component 11 from being retained on enlarged head 66 when pusher plate 13 is retracted. Pusher plate 13 is mounted on a reciprocating means for driving, not shown but well known in the art, wherein the means for driving is adapted to drive pusher plate 13 upwardly through holes 15 and apertures 17 carrying therewith a plurality of individual die-cut components 11 each individual die-cut component 11 on a separate pusher 12.

Intermediate clamping plate 14 is formed from a second sheet of material, again preferably steel, and has an array of holes 15 disposed therethrough, holes 15 slightly larger than enlarged head 66 of pusher 12 such that enlarged head 66 of pusher 12 may pass freely therethrough. Intermediate clamping plate 14 may be affixed to pusher plate 13 on spring loaded pins, not shown, however common used with a clicking die set wherein intermediate clamping plate 14 retracts from engagement with catcher plate 16 as pusher plate 13 is retracted. Intermediate clamping plate 14 is a lower clamping plate of a pair of clamping plates adapted to receive previously cut larger sheet 23 therein and has previously cut larger sheet 23 clamped therebetween. The other of the pair of clamping plates is catcher plate 16 which may also be affixed to pusher plate 13 and intermediate clamping plate 14 on spring loaded pins, not shown.

Catcher plate 16 is also formed from a sheet of material, preferably steel, and has corresponding array of apertures 17 therethrough, apertures 17 aligned with holes 15 in intermediate clamping plate 14 and pushers 12 of pusher plate 13. Apertures 17 in catcher plate 16 preferably has approximately the same dimensions as the outer peripheral dimensions 70 of individual die-cut component parts 11 such that as pusher 12 passes through holes 15 and apertures 17, webs 71 retaining individual die-cut components 11 on previously cut larger sheet 23 after die-cutting are broken thereby separating each individual die-cut component 11 from previously cut larger sheet 23. Means 24 for receiving is disposed on upper surface 25 of catcher plate 16 and comprises guide pin 31 with at least one catcher 27 journaled in journal holes 42. Guide pin 31 may be formed of a one-quarter inch diameter aluminum rod approximately 12 inches in length, guide pin 31 having a reduced portion 51 on end 50 about one-quarter inch in length, reduced portion 51 adapted to be received in a hole 54 in catcher plate 16. Though this recitation describes one guide pin 31, guide pin 31 may be of any length commensurate with 5 individual die-cut components 11 to be separated from previously cut larger sheet 23 and also may be of any size or shape. For instance, it may be beneficial to use rectangular rods for guide pin 31 wherein thickness 45 is less than corresponding transverse cross section length, however, thickness 45 is still substantially the same or slightly less than width dimension 46 of web 32. Furthermore, although guide pin 31 is preferably a round section of aluminum rod, guide pin 31 may also be formed of other rigid material such as steel, thermoplastic carbon fiber, glass fiber, synthetic fiber or combinations of the above. Guide pin 31 is affixed to catcher plate 16 by force fitting reduced portion 51 into hole 54 in catcher plate 16 wherein end 50 is spaced inwardly in hole 54 from bottom surface 53. Guide pin 31 may also be welded to catcher plate 16 with weldment 35 or may be affixed thereto with a threaded fastener 34 disposed in a threaded hole in end 50.

Preferably, at least two modular components 78 joined end to end comprise guide pin 31 wherein guide pin 31 has a first catching position located adjacent upper surface 25 of catcher plate 16 and an elevated catching position 81, best shown in FIG. 3, spaced above upper surface 25 wherein pusher 12 upstacks a preset number of individual die-cut components 11 on catchers 27 above upper surface 25 of catcher plate 16 and upon achieving the preset number, pushers 12 are advanced an additional amount to raise the preset number of individual die-cut components 11 to an elevated position 81 spaced above upper surface 25 of catcher plate 16 for ease of removal without touching individual die-cut components 11 already stacked on upper surface 25. Thus, as shown in FIGS. 2 & 3, at least modular component 78 disposed in upper surface 25 of catcher plate 16 and modular component 78 disposed immediately thereabove each have catchers 27 journaled in journal holes 42 therein. In order to join modular components 78 one to the other, a stub 77 is provided on top end 82 of modular component 78 adapted to be inserted into a hole 84 disposed in bottom end 83 of modular component 78. Stub 77 may be threaded and threaded into hole 84 or may be a precision diameter pin adapted to be press fit into hole 84. Preferably, stub 77 is a split roll pin 80 which is press fitted into hole 79 in top end 82 of modular component and thereafter press fitted into hole 84 in bottom end 83. Thus, guide pin 31 may be extended further by adding additional modular components 78 in end to end fashion, however, it is usually only necessary to provide two modular components 78 in end to end fashion with bottom end 83 disposed into catcher plate 16. It is also desired to provide a support plate 85 between modular components 78 to hold catchers 27 in a substantially horizontal disposition for upstacking the preset number of individual die-cut components 11 thereupon. Support plate 85 preferably has registry locators thereon adapted to be registered with mating registry locators in either bottom end 83 or top end 82 of modular components 78, these registry locators not shown. It is often beneficial to use tubular stock for modular components 78 wherein the tubular stock has hole 79 provided therethrough and thus it is merely a matter of driving a split roll pin 80 into hole 79 to provide for stub 77.

Catcher 27 is preferably 17 gauge U.S. steel wire bent into rectangular shape 72 as shown separated from guide pin 31 in FIG. 2. Thus, catcher 27 is considerably thinner in cross sectional height than the prior art catchers resulting in a shorter stroke length required to raise individual die-cut component parts 11 into a stacking relationship above catcher 27. This shorter stroke length, when combined with the shorter stroke length resulting from the narrower depth 74 of catcher 27 further compounds the savings realized by the teachings of this invention. Catcher 27 generally has a length 73 greater than its depth 74, however, where catcher 27 is formed in a round shape, length 73 may be substantially the same as depth 74. Opposed ends 29, 30 are adapted to be received in journal holes 42 disposed into guide pin 31 wherein journal holes 42 are spaced from a centerline 47 of guide pin 31. Thus, catchers 27 may be placed on guide pin 31 extending in opposite directions yet freely rotatable about their respective opposed ends 29, 30 and thus adapted to overlie two adjacent apertures 17 disposed through catcher plate 16. As hereinbefore recited, catcher 27 is preferably steel wire, however, catcher 27 may be molded of a thermoplastic material, formed of a natural or synthetic fiber or formed from a different metallic material without departing from the scope of this invention. Furthermore, catcher 27 may have a cross section other than round as it is possible according to the teachings of this invention to us flat staple wire for catcher 27. Journal holes 42 are preferably spaced at least one-half the thickness 49 of loop 28 of material forming catcher 27 above a shoulder 48 formed by reduced portion 51, thus allowing catcher 27 to freely rotate within journal holes 42. Journal holes 42 are preferably slightly larger in diameter than the largest cross sectional dimension of loop 28 to permit free rotation of loop 28 therein.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. A self-pivoted catcher for the up-stacking of die-cut thermoformed component parts comprises a low mass loop of material having opposed ends thereof journaled in a guide pin, said guide pin affixed to a narrow web of a catcher plate between parallel rows of apertures disposed through said catcher plate, said guide pin having a reduced portion on one end thereof, said reduced portion force fit into said catcher plate, said catcher adapted to move upwardly with movement of said die-cut component separated from a large sheet and advanced through said catcher plate, said loop adapted to engage the underside of a lip of said die-cut component thereby retaining said die-cut component on an upper side edge of said catcher.

2. A self-pivoted catcher as in claim 1 wherein said guide pin has a thickness dimension substantially equal to the width of said narrow web.

3. A self-pivoted catcher as in claim 1 wherein said guide pin is round.

4. A self-pivoted catcher as in claim 1 wherein said guide pin is rectangular.

5. A self-pivoted catcher as in claim 1 wherein said guide pin has a shoulder spaced from said one end, said reduced portion terminating at said shoulder wherein said reduced portion is secured in said catcher plate.

6. A self-pivoted catcher as in claim 1 wherein said journal hole in said guide pin is disposed at least one-half the thickness of said loop upwards from said shoulder.

7. A self-pivoted catcher as in claim 1 wherein the depth of said low mass loop is substantially equal to width of the lip of said die-cut thermoformed component part.

8. A self-pivoted catcher as in claim 1 wherein said guide pin has a pair of said loops extending in opposite directions wherein said loops are journaled in separate journal holes in said guide pin.

9. A self-pivoted catcher as in claim 1 wherein said guide pin is centrally located between adjacent apertures and centrally located on an edge web.

10. A self-pivoted catcher as in claim 1 wherein a portion of said low mass loop is resting on said web of said catcher plate adjacent said guide pin.

11. A self-pivoted catcher as in claim 1 wherein said low mass loop is formed into a substantially circular shape.

12. A self-pivoted catcher as in claim 11 wherein said low mass loop of material is a length of round stock selected from the group comprising metallic wire, molded thermoplastic or combinations thereof.

13. A self-pivoted catcher as in claim 1 wherein said low mass loop is formed into a polygonal shape.

14. A self-pivoted catcher as in claim 13 wherein said polygonal shape is rectangular.

15. A self-pivoted catcher for the up-stacking of die-cut thermoformed components comprises a loop of material having opposed ends thereof journaled in a straight upright columnar guide pin affixed to a web of a catcher plate between parallel columns of apertures disposed through said catcher plate, said catcher adapted to move upwardly with movement of said die-cut component separated from a large sheet and advanced through said catcher plate, said loop adapted to engage the underside of a lip of said die-cut component, said loop having a portion thereof resting on said web of said catcher plate adjacent said guide pin thereby retaining said die-cut component on an upper side edge of said catcher.

16. A self-pivoted catcher as in claim 15 wherein said guide pin has a thickness dimension less than the width of said narrow web, said guide pin centrally located in said web.

17. A self-pivoted catcher as in claim 15 wherein said at least one said catcher is adapted to engage at least an edge of a lip of said individual die-cut component thereby retaining said die-cut component on an upper side edge of said catcher.

18. A self-pivoted catcher as in claim 15 wherein said at least one said catcher falls by gravity under the underside of said lip of said die-cut component of said individual die-cut component.

19. In a separator/stacker device for the separation and up-stacking of individual die-cut thermoformed components separated from a larder, previously cut sheet of said die-cut components, said device comprising a plurality of pushers mounted on a pusher plate, an intermediate clamping plate having a plurality of holes therethrough and a catcher plate having a plurality of apertures disposed therethrough, said plurality of apertures separated by webs, the improvement comprising a plurality of straight upright columnar guide pins for guiding a plurality of die-cut components in the up-stacking of said die-cut components, said guide pins arranged on and affixed to each said web between parallel rows and parallel columns of said apertures formed through said catcher plate, said catcher plate adapted to have said plurality of pushers forced through said apertures for separating said die-cut components from said larger, previously cut sheet of die-cut components, each said plurality of guide pins carrying at least one catcher comprising a loop of material having opposed ends thereof journaled in said guide pin, said catcher adapted to move upwardly with movement of said pusher carrying said die-cut component separated from said larger sheet upwardly through said catcher plate, said loop engaging the underside of a lip of said die-cut component, said loop retracting to a substantially horizontal position upon retraction of said pusher from said aperture of said catcher plate, said loop thus having a portion thereof resting on said web of said catcher plate adjacent said guide pin thereby retaining said die-cut component on an upper side edge of said catcher.

* * * * *